April 25, 1939. W. E. BAXTER 2,155,885
GLASS CUTTER
Filed Oct. 14, 1937 2 Sheets-Sheet 1
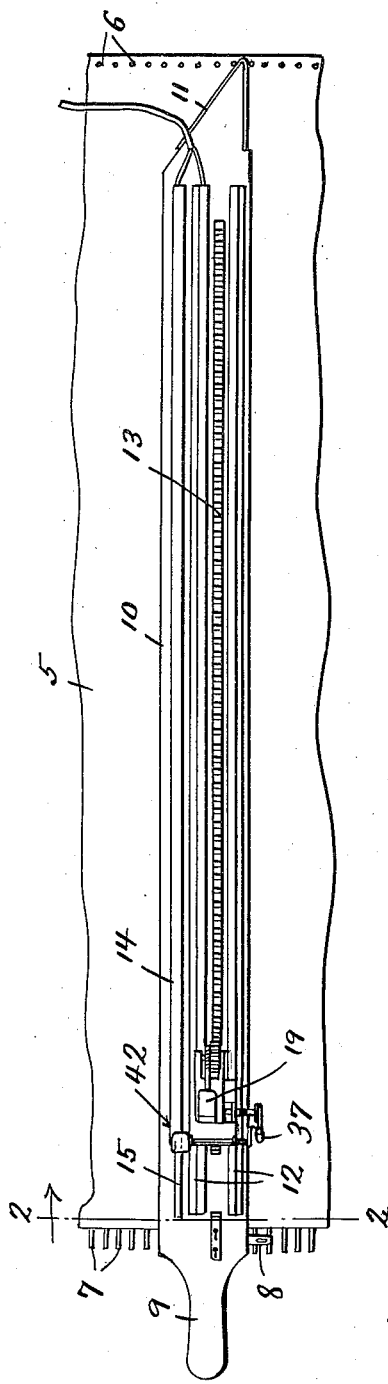
Inventor
William Eugene Baxter
By Clarence A. O'Brien
Hyman Berman
Attorneys Inventor
William Eugene Baxter Patented Apr. 25, 1939

2,155,885

UNITED STATES PATENT OFFICE 2,155,885

GLASS CUTTER

William E. Baxter, Charleston, W. Va.

Application October 14, 1937, Serial No. 169,011

1 Claim. (Cl. 33—32)

This invention relates to new and useful improvements in glass cutters of the type adapted to cut sheet glass.

The principal object of the present invention is to provide a glass cutter wherein the glass cutting carriage is operated by an electric motor.

Another important object of the invention is to provide a motor driven glass cutter wherein the motor is controlled by the work.

These and various other important objects and advantages of the invention will become apparent to the reader of the following specification.

In the drawings:

Figure 1 represents a fragmentary top plan view of the table and cutting mechanism.

Figure 2 is a cross-sectional view taken substantially on line 2—2 of Figure 1.

Figure 3:
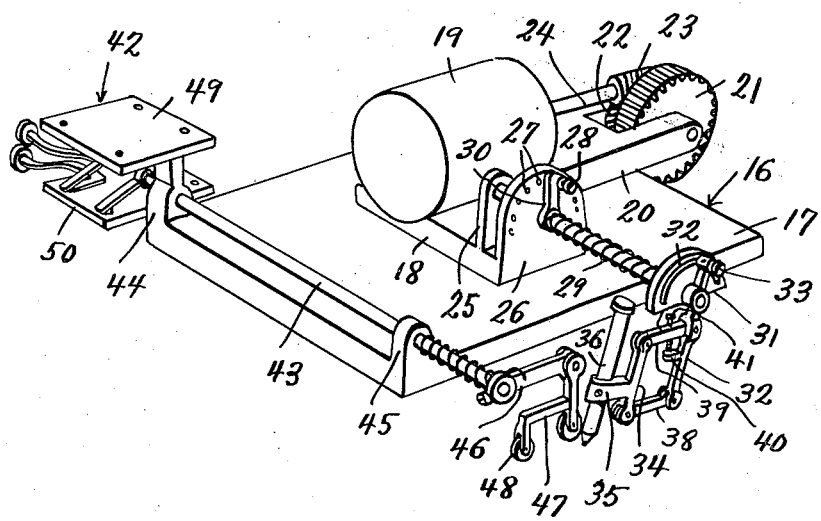
Figure 3 is a perspective view of the carriage.
Figure 4:
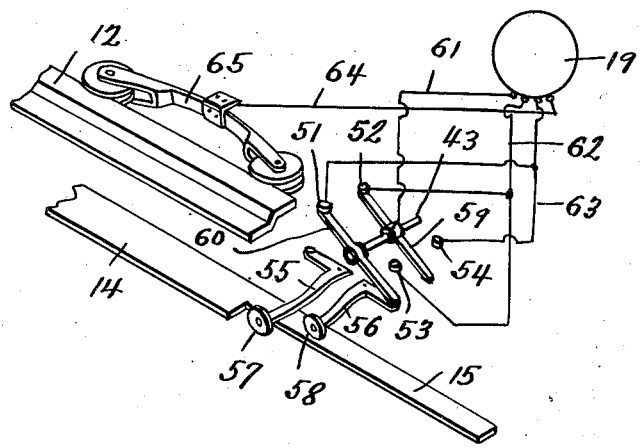
Figure 4 is a diagrammatic view disclosing the electrical connections between the electrical devices involved.

Referring to the drawings, wherein like numerals designate like parts, it can be seen that numeral 5 denotes the glass supporting table along one edge of which are the upright pins 6 equi-distantly spaced, while at the opposite edge of the table 5 are the horizontally disposed pins 7 equi-distantly spaced and between which the pin 8 on the handle portion 9 of the rule 10 is engageable. The opposite end of the rule 10 is provided with the acutely shaped portion 11 for engagement between certain of the upstanding pins 6.

Disposed longitudinally on the rule 10 are the guide flanges 12 for the carriage and longitudinally extended between these guide flanges 12 is the cog track 13 suitably secured to the rule. Furthermore, secured to the rule 10 is the elongated contact strip 14 having the narrow extension 15 at one end thereof.

The carriage generally referred to by numeral 16 consists of the plate 17 having the motor base 18 thereon and upon which the motor 19 is mounted. Extending from the base 18 is the bifurcated plate 20 between the furcations of which are rotatably mounted the gear 21 carrying the worm 22 with which the worm 23 of the armature shaft 24 meshes. This gear 21 meshes with the track 13 on the rule 10.

An upstanding bearing 25 on the motor base 18 is located adjacent the upstanding panel 26 which has recesses 27 therein for receiving the detent 28 on the shaft 29, which shaft extends through the panel 26. The detent 28 is carried by the arm 30 which projects laterally from the shaft 29. The outer end of the shaft 29 carries the semi-circular shaped plate 31 having the slotway 32 therein. On this end of the shaft 29 is also rockably mounted the rocker 32 one end of which is provided with a retention device 33 disposed through the slot 32 and being adapted to be tightened to firmly grip the said plate 31.

A member 34 is provided with a lateral member 35 in which the holder 36 for the diamond point 37 is mounted. The member 34 is connected by pivotal links 38—39 to the rocker 32, and the rocker, as shown in Figure 3, is provided with the lug 40 with which the set screw 41 on the link 39 is adapted to abut.

For operating the switch mechanism generally referred to by numeral 42 (see Figure 3), a shaft 43 is journaled through the bearings 44—45 on one end of the plate 17. One end of the shaft 43 has the laterally disposed arm 46 from which depends the L-shaped member 47 carrying a pair of rollers 48. These rollers are located laterally of the carriage 16 and rides against the table 5 and upon the sheet glass to be cut.

Supported by the carriage 17 are the upper and lower plates 49—50 which carry the upper contacts 51—52 and 53—54 on the upper plate 49, while the lower plate has the spring arm 55—56 extending therefrom and provided with rollers 57—58, respectively, on their outer ends. Rockable switch blades 59—60 are capable of being rocked by the shaft 43 between the plates 49—50 for engaging the blade 59 with the contact 52 and at the same time the blade 60 with the contact 51 and also with the contact arm 56 which is engaging the strip 14.

The motor 19 is of the reversible type and has the conductor 61 extending from the same to the blade 59. The wire 62 extends to the contact 52 and 53 while the wire 63 extends to both the contacts 51 and 54. The conductor wire 64 extends from the motor to one of the grooved roller mounts 65 carried by the carriage plate 17 and ridable along one of the guide flanges 12.

In the use of the device, the operator places the rule with its pins in proper engagement with the pins 6—7 and as the rule 10 is lowered into position the switch operating rollers 48 will ride on the glass to be cut, this raising the rollers so that the switch is closed, supplying current to the motor for forward cutting travel of the carriage 16, and it automatically travels forward, and in this operation cuts the glass with the cutter 37. When the diamond point reaches the end of the sheet it is cutting, the switch operating wheels 48 go over the edge of the glass and drop down far enough to operate the switch to cut off current and stop the motor. As the operator raises the rule to make the next cut, the switch operating wheels drop further down and close the switch again which furnishes power for the automatic return of the carriage. The cutting action is entirely automatic as the operator has only to put the rule where he wants the glass cut.

As is shown in Figures 2 and 3 a spring is provided on the shaft 29 to afford the proper tension for the diamond.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

A rule for glass cutting tables comprising an elongated member provided with a traveling carriage thereon, a motor on the carriage, a glass cutter carried by the carriage, drive means between the motor on the carriage and the said elongated member, a switch on the carriage, a shaft extending from the switch, a roller carried by the shaft and engageable with the work, said roller being operative in riding onto the work and off of the work to close the switch and open the switch, said switch being interposed between the motor and the source of current.

WILLIAM E. BAXTER.